(12) United States Patent  
Mizukoshi et al.

(10) Patent No.: US 6,533,668 B2  
(45) Date of Patent: Mar. 18, 2003

(54) CONSTANT VELOCITY JOINT OF TRIPOD TYPE

(75) Inventors: Yasumasa Mizukoshi, Fujisawa (JP); Minoru Ishijima, Isesaki (JP); Toshihiro Ikeda, Takasaki (JP)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/977,778

(22) Filed: Oct. 15, 2001

(65) Prior Publication Data

US 2002/0055390 A1 May 9, 2002

(30) Foreign Application Priority Data

Oct. 16, 2000 (JP) ........................................ 2000-315523

(51) Int. Cl.$^7$ .............................................. F16D 3/202
(52) U.S. Cl. ........................ 464/111; 464/124; 464/905
(58) Field of Search ................................ 464/111, 112, 464/115, 120, 122, 123, 124, 905; 403/122, 126

(56) References Cited

U.S. PATENT DOCUMENTS

| | | | | |
|---|---|---|---|---|
| 4,747,803 A | * | 5/1988 | Kimata et al. | 464/111 |
| 5,114,261 A | * | 5/1992 | Sugimoto et al. | 403/122 |
| 5,256,107 A | * | 10/1993 | Matsumoto et al. | 464/111 |
| 6,264,565 B1 | * | 7/2001 | Sugiyama et al. | 464/111 |
| 6,454,655 B1 | * | 9/2002 | Kudo et al. | 464/111 |

* cited by examiner

Primary Examiner—Lynne H. Browne  
Assistant Examiner—Kenn Thompson  
(74) Attorney, Agent, or Firm—Edmund P. Anderson

(57) ABSTRACT

The object of the invention is to provide a constant velocity joint of tripod type which is both highly strong and durable, and which can minimize rolling resistance when transmitting torque at a joint angle. A tripod type constant velocity joint comprises a housing secured to a first rotating shaft and a tripod having trunnion axes spaced apart equally in a circumferential direction and securing equally to the second rotating shaft. The cross section normal to the trunnion axis is shaped to an ellipse and the direction of its short diameter is arranged parallel to the second rotational shaft.

9 Claims, 22 Drawing Sheets

Y-Y SECTIONAL VIEW
(TRUNNION AXIS)

(A)

(B)

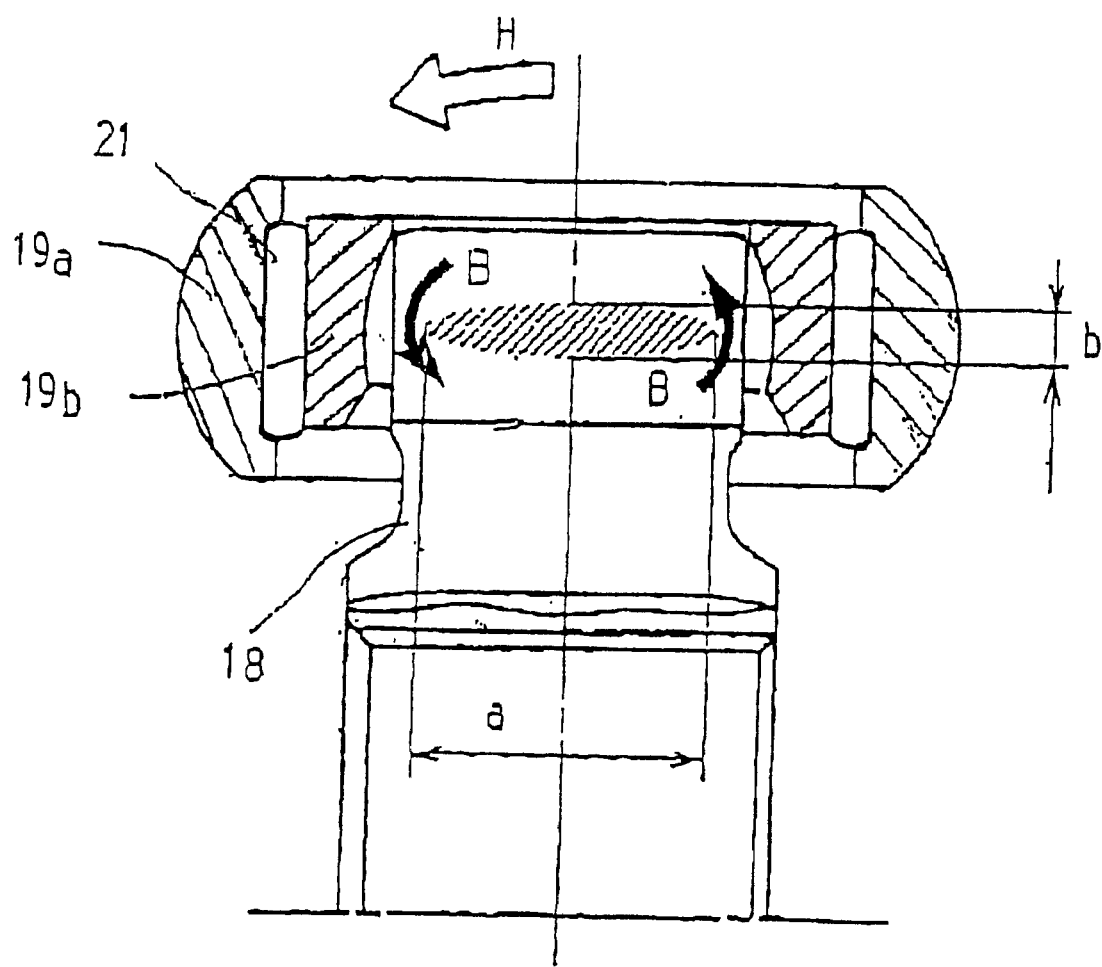

CONSTANT VELOCITY JOINT OF TRIPOD TYPE

FIELD OF THE INVENTION

The present invention relates to a tripod type constant velocity joint, which is disposed between rotating shafts connected at a joint angle with each other in a drive axle of, for example, an automobile, for transmitting a rotational torque.

BACKGROUND OF THE INVENTION

Tripod type constant velocity joints are one of a number of types of constant velocity joints used in drive axles of, for example, automobiles.

For example, Japanese Laid Open Patent Application Nos. S63(1988)186036 and S62(1987)-233522 disclose a tripod type constant velocity joint 1, as shown in FIGS. 18 and 19(A—A cross sectional view of FIG. 18). This constant velocity joint 10 is provided with a hollow cylindrical housing 13 which is secured to an end of a first rotating shaft 12 serving as a drive shaft or the like on the differential gear side, and a tripod 15 which is secured to an end of a second rotating shaft 14 serving as driven shaft or the like on the wheel side. Grooves 16 are formed at three locations on the internal face of the housing 13 at an even spacing in the circumferential direction and extend outwardly in the radial direction of the housing 13 from said internal face.

On the other hand, the tripod 15 secured at one end of the second rotating shaft 14 comprises a unified form of a boss 17 for supporting the tripod 15 at one end of the second rotating shaft 14, and cylindrical trunnions 18 extending radially from three locations at equal spacing around the boss 17 in the circumferential direction. Around the tip end of the respective trunnions 18, rollers 19 are rotatably supported through a needle bearing 10, while allowing the rollers to be displaced in the axial direction by certain distances. A tripod type constant velocity joint 10 is provided by engaging the respective rollers 19 with the respective guide grooves 16 on an inner face of the housing 13. The respective pairs of side faces 11, on which each of the above guide grooves 16 is provided, are formed to circular recesses. Accordingly, each of the rollers 9 is rotatably and pivotably supported between the respective pairs of the side faces 11.

When the constant velocity joint 10 as described above is used, for example, the first rotational shaft 12 is rotated. The rotational force of the first rotational shaft 12 is, from the housing 13, through the roller 19, the needle bearing 20 and the trunnion 18, transmitted to the boss 17 of the tripod 15, thereby rotating the second rotational shaft 14. Further, if a central axis of the first rotational shaft 12 is not aligned with that of the second rotational shaft 14 (namely, a joint angle is not zero in the constant velocity joint 10), each of the trunnion 18 displaces relative to the side face 16a of each of the guide groove 16 to move around the tripod 15, as shown in FIGS. 18 and 19. At this time, the rollers 19 supported at the ends of the trunnions 18 move along the axial directions of the trunnions 18, respectively, while rolling on the side faces 16a of the guide grooves 16, respectively. Such movements ensure that a constant velocity between the first and second rotational shafts 12 and 14 is achieved.

If the first and second rotational shafts 12 and 14 are rotated with the joint angle present, in the case of the constant velocity joint 10 which is constructed and operated as described above, each of the rollers 19 moves with complexity. For example, each of the rollers 19 moves in the rotational axis 12 of the housing 13 along each of the side faces 16a of the respective guide grooves 16, while the orientations of the rollers 19 are being changed and further the rollers 19 displace in the axial direction of the trunnion 18. Such complex movements of the rollers 19 cannot cause a relative movement between a peripheral outside face of each of the rollers 19 and each of the side faces 16a of the guide grooves 16 to be smoothly effected. Thus, a relatively large friction occurs between the faces. As a result, in the constant velocity joint 10, three-directional axial forces occurs per one rotation. It is known that an adverse oscillation referred to as "shudder" may occur in some cases, if a large torque is transmitted with a relatively large joint angle present.

In order to solve the above problem, FR275280 discloses a structure as shown in FIG. 20 and the Japanese Laid-Open patent application No. H3-172619 discloses a structure as shown in FIG. 21. In the structure shown in FIG. 20, a roller is guided parallel to a housing groove and a spherical trunnion 18 can swing and pivot around a inner spherical surface of an inner roller 19b. Further, a contact area between the inner spherical surface of the inner roller 19b and the trunnion 18 when receiving a torque for a load is shaped to an ellipse having a larger long diameter, because a radius "r" of a longitudinal cross-sectional shape of the spherical trunnion 18 is smaller than a radius "r3" of the trunnion 18. In the structure shown in FIG. 21, a torque for a load is received between an inner cylindrical surface of an inner roller 19b and a spherical trunnion 18. Thus, a width (a short diameter) "b" of a contact ellipse shaped therebetween is smaller and a contact length "a", in the circumference of a contact area, which corresponds to a long diameter of the contact ellipse is larger. In fact, the contact ellipse is positioned on the side of the trunnion 18 facing with the side face 16a of the guide groove 16, although the contact ellipse is shown at the front side for clarification in FIG. 21. When these joints rotate with joint angles present upon receiving loads, as shown in FIG. 22, a pivotal movement (of a direction indicated by an arrow "H") of the trunnion 18 causes a pivotal sliding action to be occurred on the contact ellipse. Then the pivotal sliding action operates as a spin moment (of a rotational direction indicated by arrows "B") so as to change a rolling direction of the roller assembly 19 comprising the inner roller 19b and the outer roller 19a, which are assembled together via a needle bearing 21. As a result, the direction of the roller assembly 19 is changed until it is in contact with inner or outer face of the guide groove 16, and in addition a contact force is increased. Moreover, the roller assembly 19 displaces not to be parallel to the guide groove 16. Hence, it is difficult for the roller assembly 19 to be smoothly rolled, bringing about a significant rolling resistance.

It is contemplated to enlarge a difference between an inner diameter of the inner roller 19b and an outer diameter of the trunnion 18, in order to reduce the long diameter "a" of the contact ellipse. In this case, however, there is raised a new problem in which the joint fluctuates when moving along the rotational direction.

SUMMARY OF THE INVENTION

The object of the present invention is to overcome the above disadvantages of prior art, that is, to provide a tripod type constant velocity joint having a simple structure which is both highly strong and durable, which can diminish a spin moment acting on the contact ellipse formed between the outer face of the trunnion and the inner face of the inner roller, due to the pivotal sliding movement of the trunnion axis, and which can minimize a rolling resistance when rotating with any joint angle present.

To solve the above problems, according to the invention, a constant velocity joint of tripod type comprises:

A cylindrical hollow housing defining an opening at one end, and being secured at its opposite end to a first rotating shaft such that a central axis of the housing is aligned with that of the first rotating shaft, an inner face of the housing being provided with three guide grooves extending in a axial direction of the housing and being spaced apart equally in a circumferential direction, each groove having a pair of side faces opposed to each other, extending in the axial direction, and a bottom portion connecting between the side faces; and A tripod provided at an angle normal to a second rotating shaft and secured to one end of the second rotating shaft, the tripod having three trunnions positioned in the grooves, the trunnions being spaced apart equally in a circumferential direction and securing equally to the second rotating shaft at an angle normal, with respective inner rollers being mounted to outside end portions of respective trunnions, and with respective outer rollers being mounted on the outer faces of inner rollers through a needle bearing, the outer faces of the outer rollers being shaped so as to allow movement only in an axial direction of the guide grooves, the side faces receiving a load, and a part of the bottom portion guiding the rolling of the outer roller.

The constant velocity joint of tripod type is characterized in that, the inner rollers have a spherical inner circumferential surface, respectively; and The trunnions have a elliptical shape in the sectional view normal to each of their axes, respectively and is positioned so that the short diameter of the ellipse is substantially parallel to the second rotating shaft.

According to the invention as constructed above, elliptical contact areas formed in transmitting torque between the inner spherical face of the inner roller and the outer face of the generally spherical trunnion can be maintained relatively small without significant fluctuations during rotating. Thus, it is possible to diminish a spin moment acting on the contact ellipse due to the pivotal sliding movement of the trunnion axis. Accordingly, the invention can bring about advantages including a relatively small contact force between the outer roller and the guide groove, a stable rolling of the outer roller, a smaller rolling resistance and a lower axial force of the joint.

These and other objects and advantages of the present invention will be more apparent from the following detailed description and drawings in which:

BRIEF DESCRIPTION OF THE DRAWINGS

The presently preferred embodiment of the invention is disclosed in the following description and in the accompanying drawings, wherein:

FIG. 22 is an explanatory view showing a spin moment generating in a conventional tripod type constant velocity joint.

DESCRIPTION OF THE PREFERRED EMBODIMENTS

Figure 1:
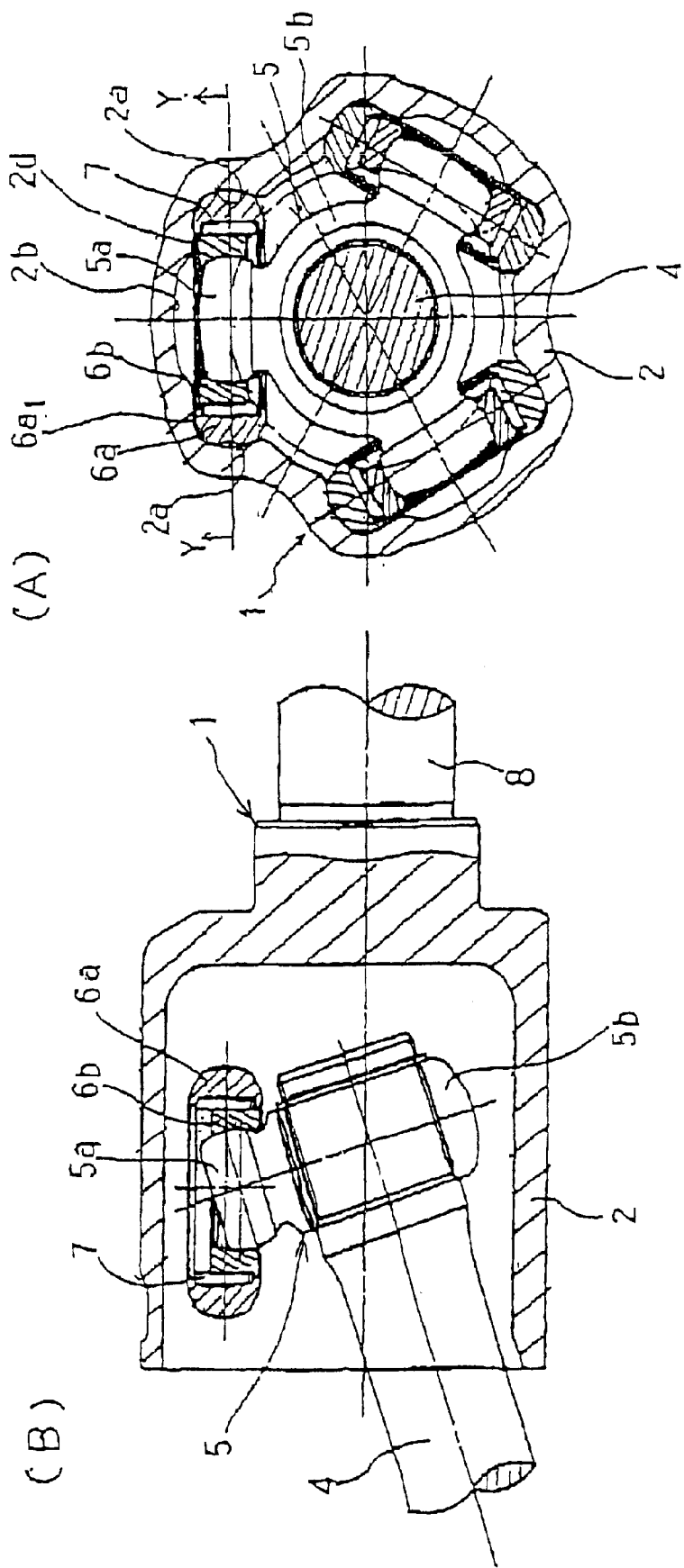
FIG. 1 shows cross-sectional views showing the first embodiment of the present invention, wherein FIG. 1 (*a*) is a longitudinal cross-sectional view and FIG. 1 (*b*) is a side cross-sectional view.
Figure 2:
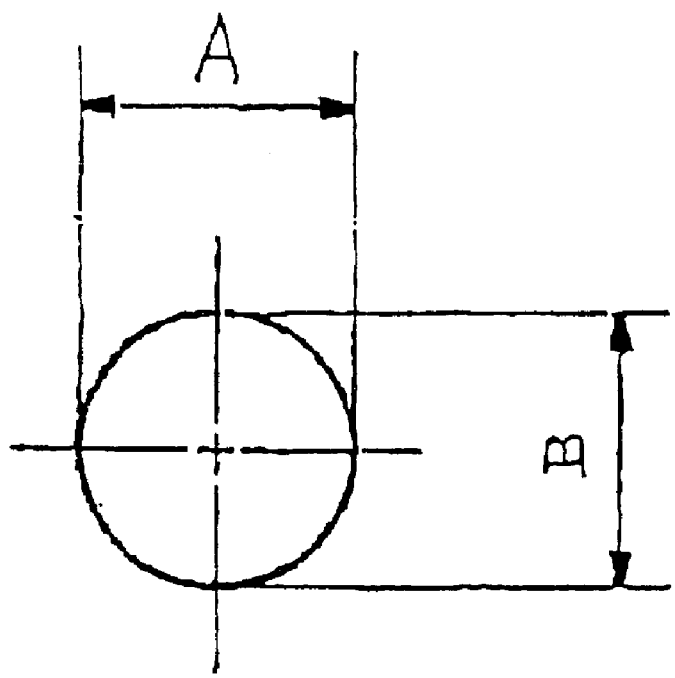
FIG. 2 is a cross-sectional view of a trunnion axis taken along the line Y—Y.
Figure 3:
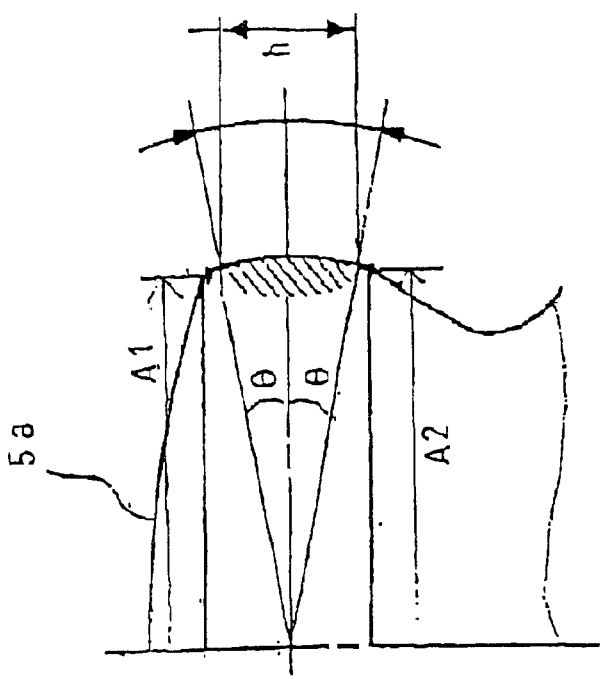
FIG. 3 consists of views showing the trunnion axis of FIG. 1, wherein FIG. 3(*a*) is a partial view thereof and FIG. 3(*b*) is a side view thereof seen from the side of the guide groove.
Figure 3:
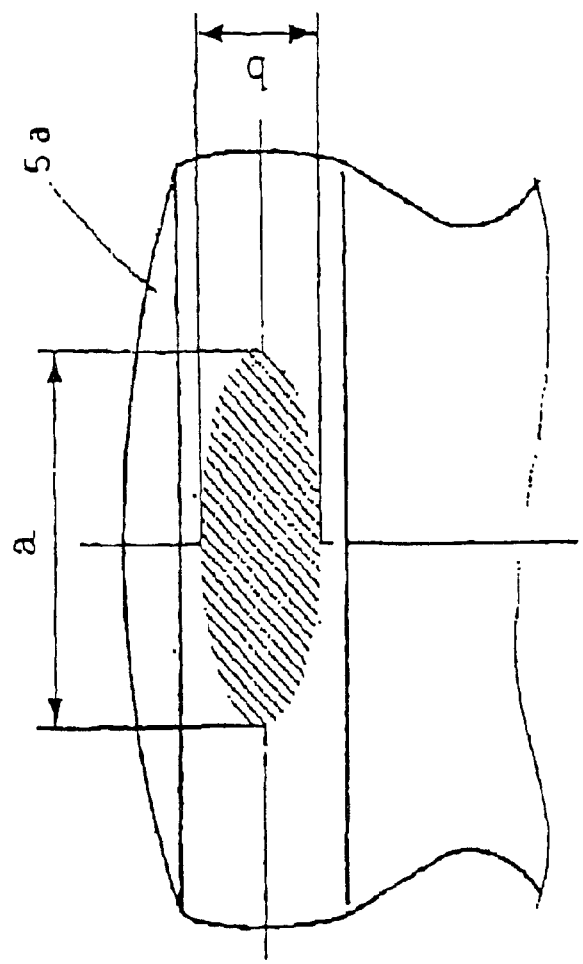
Figure 4:
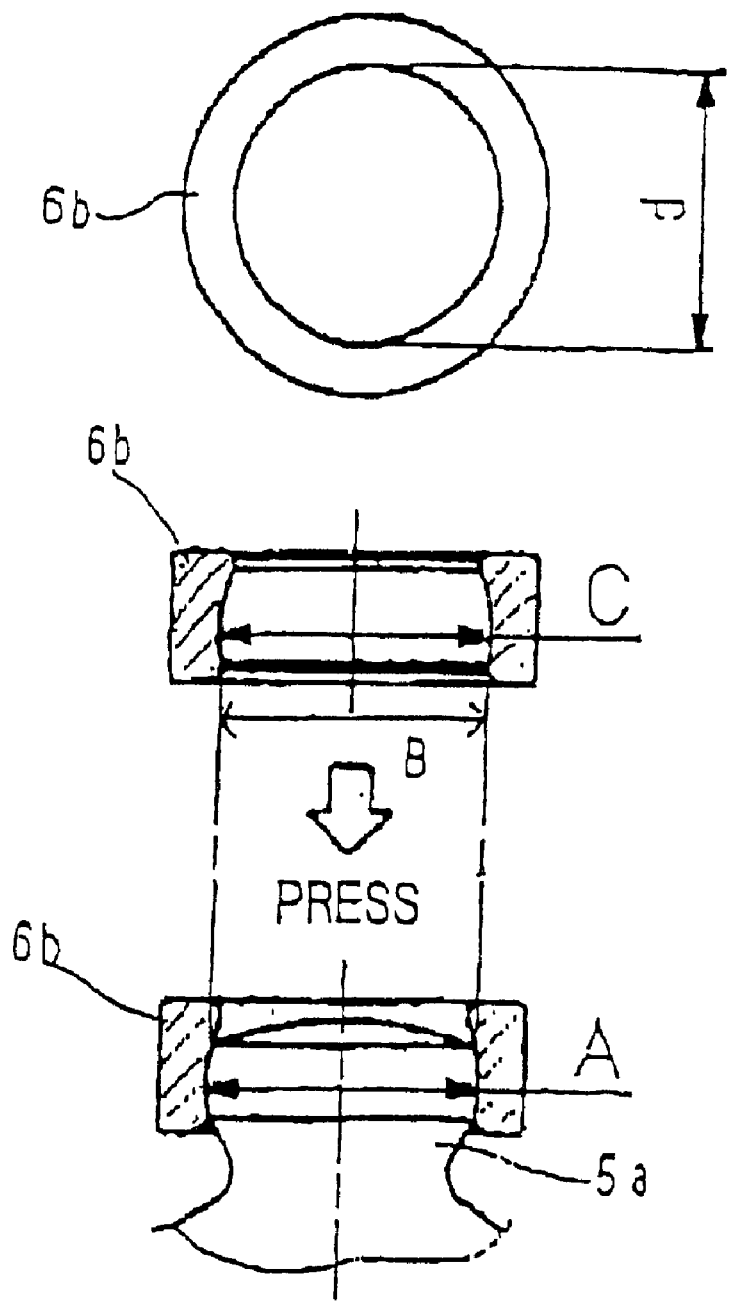
FIG. 4 is an explanatory view showing a relationship regarding location between the trunnion axis and the inner roller.
Figure 5:
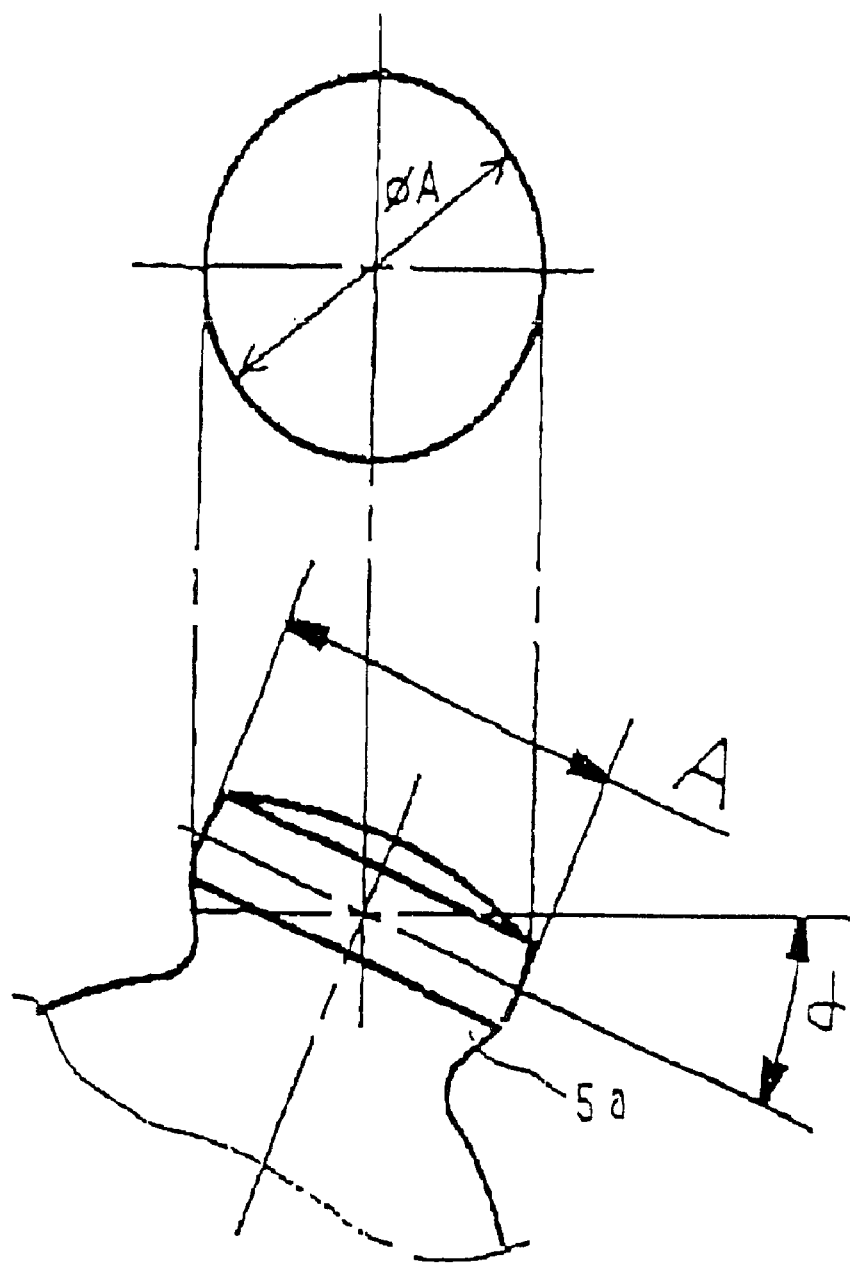
FIG. 5 is an explanatory view showing a configuration projected from a direction inclined by an angle α, of the trunnion axis.
Figure 6:
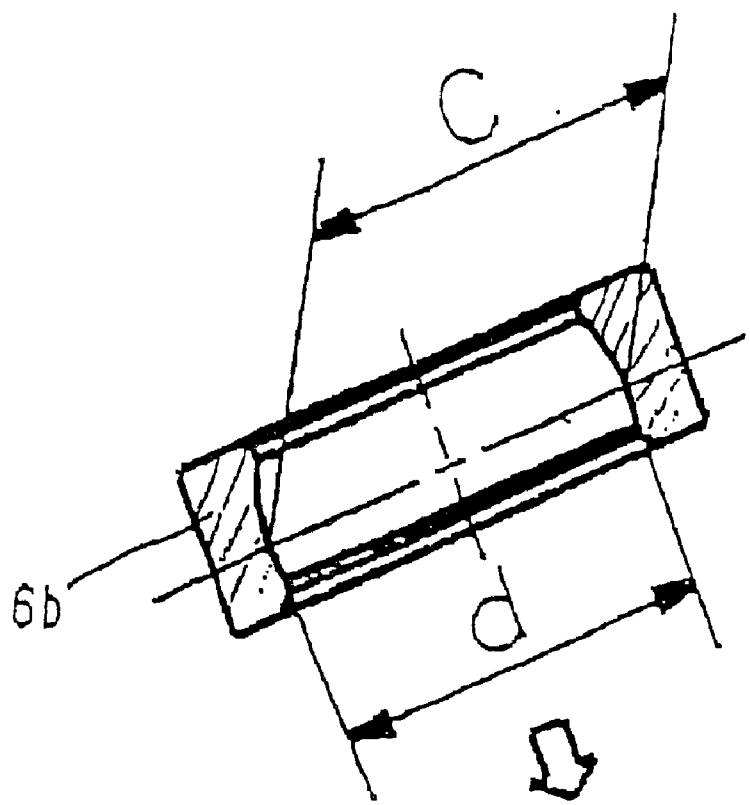
FIG. 6 is a cross-sectional view of the inner roller.
Figure 7:
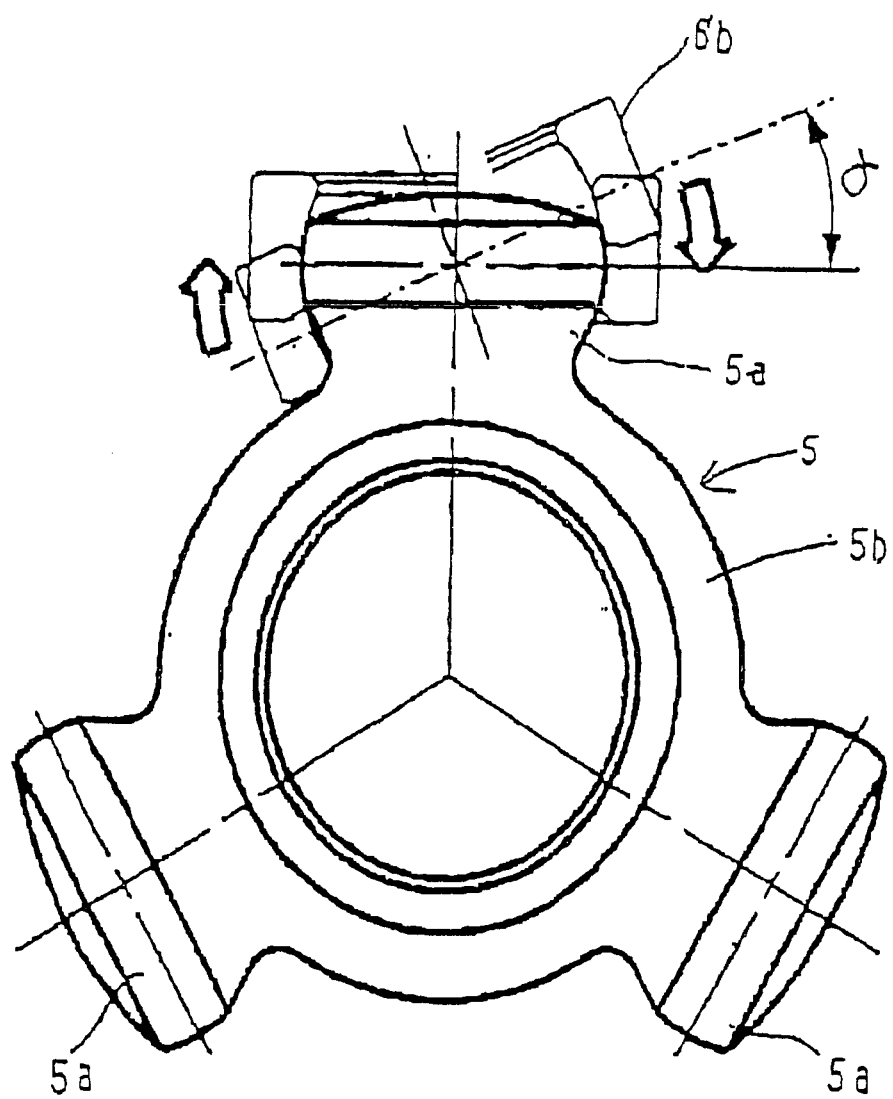
FIG. 7 is an explanatory view showing the relationship regarding location between the trunnion axis and the inner roller with the inner roller inclined by an angle α.

The first embodiment of the present invention will be described with reference to the drawings. FIG. 1 shows cross-sectional views of a tripod type constant velocity joint according to the first embodiment of the present invention; wherein, FIG. 1 (A) is a longitudinal cross-sectional view, and FIG. 1 (B) is a side cross-sectional view. FIG. 2 is a cross-sectional view of the trunnion axis taken along the line Y—Y of FIG. 1. FIG. 3 shows views of a trunnion axis shown in FIG. 1; wherein FIG. 3(A) is a partial view thereof and FIG. 3(A) is a side view thereof seen from the side of a guide groove. FIG. 4 is an explanatory view showing the relationship regarding location between the trunnion axis and the inner roller. FIG. 5 is an explanatory view showing a configuration projected from a direction inclined by an angle α, of the trunnion axis. FIG. 6 is a cross-sectional view of the inner roller. FIG. 7 is an explanatory view showing the relationship regarding location between the trunnion axis and the inner roller with the inner roller inclined by an angle α.

FIG. 1 shows a cross sectional shape of a tripod type constant velocity joint 1. A tripod 5 is fixedly engaged with a tip end of a second rotating shaft 4 such as a rotational shaft of a wheel, and comprises a boss 7 secured to the second rotating shaft 4 for supporting the tripod 5, and three trunnion axes 5a being integrally formed at equal spacings around the boss 7 in the circumferential direction and extending in the radial direction from the boss 7. As shown in FIG. 2, each of the trunnion axes 5a has an elliptical shape in the sectional view (a cross section) normal to each center of the trunnion axes, which is symmetric with respect to each center of the trunnion axes. Each of these ellipses has a short diameter B which is in the direction of the second rotational shaft 4 and a long diameter A which is in the direction normal to the short diameter, namely, the direction for receiving a torque for a load. The outer face of each of the trunnion axes 5a has a generally spherical shape whose center is aligned with each center of the trunnion axes 5a, on the cross section passing through each center of the trunnion axes 5a and being normal to the second rotational shaft 4, and planes close to the cross section.

A roller assembly 6 is mounted to each of the trunnion axes 5a. The roller assembly 6 is a double-roller type which has an outer roller 6a, an inner roller 6b, and needle bearing 7 provided between the outer and inner rollers. The inner roller 6b has a generally spherical inner face, which is in contact with the generally spherical outer surface of each trunnion axis 5a. At least one rim 6a1 is formed integral with the outer roller, around one or both circumferential ends of inner face of the outer roller 6a to provide a needle roller stopper. The inner roller 6b is movable in the trunnion axial direction relative to the outer roller 6a. Alternatively, one rim 6a1 may be integral with either of both circumferential ends of inner face of the outer roller 6a, and the other rim 6a1 may be a separate member.

The tripod 5 is housed in a cylindrical hollow housing 2 defining an opening at one end, and being secured at its opposite end to a first rotating shaft 8. An inner face of the housing 2 is provided with three guide grooves 2a (formed at locations corresponding to the roller assemblies 6) extending in the direction of the first rotational shaft 8 and being spaced apart equally in a circumferential direction of the housing 2. The roller assemblies 6 are rotatably and movably received in the guide grooves 2a corresponding thereto, respectively. Each of the guide grooves 2a has a pair of side faces 2a, 2a for receiving a load and a bottom portion 2b connecting between the side faces 2a, 2a. A portion of the bottom portion 2b is provided with a tracking guide 2d for guiding the outer roller 6a.

In the trunnion axis 5a, as shown in FIG. 3(A), an axial width of the generally spherical face of the trunnion is set to a range (the hatched portion) determined in accordance with the relationship $5° \leq \theta$, wherein $\theta$ is the angle of a line connecting between the center of the trunnion and one edge of height h, relative to a cross section passing through the center of the height h, and h is the height of the generally spherical face which receives a load on the cross section (longitudinal cross section) which passes each of the trunnion axis 5a and normal to the second rotating shaft 4.

In the above-mentioned structure, the cross section normal to the trunnion axis 5a is shaped to an ellipse and the direction of its short diameter is arranged parallel to the guide groove 2. Thus, as shown in FIG. 3(B), a contact ellipse (hatched contact patch) is formed in transmitting a torque between the inner spherical face of the inner roller 6b and the generally spherical contact portion of the trunnion axis 5a and the long diameter of the contact ellipse may be relatively small without substantial fluctuations of the joint. Accordingly, a spin moment generated due to a pivotal movement of the trunnion axis 5a can be decreased. In this way, it is possible to prevent the outer roller 6a from contacting the tracking guide 2d of the groove 2 strongly, thereby bringing about a smaller rolling friction of the outer roller 6a and less axial force.

As shown in FIG. 3(A), an axial width of the generally spherical face of the trunnion axis 5a is set to a range (the hatched portion) determined in accordance with the relationship $5° \leq \theta$, namely, a range receiving a load on the outer face of the trunnion axis 5a, wherein $\theta$ is the angle of a line connecting between the center of the trunnion and one edge of height h, relative to a cross section passing through the center of the height h. Accordingly, it is possible to provide a relatively wide area for face contact around the range receiving the load.

Since the trunnion axis 5a has an elliptical feature in the cross sectional view normal to the trunnion axis as shown in the FIG. 4, even if the inner roller 6b has an inner diameter C which is very close to the long diameter A of the contact ellipse formed on the trunnion 5a to minimize fluctuations of the joint, it is also possible to assemble the joint by pressing the inner roller 6b onto the trunnion axis 5a with elastic deformation of the inner roller. However, in this case, the relationship d>B should exist, wherein d is the short diameter of the inner roller 6b elastically deformed and B is the short diameter of the ellipse of the trunnion axis 5a.

In this way, according to the embodiment, the rolling resistance of the outer roller 6a and a load acting on the trunnion axis can be decreased and thus an impact on the joint itself becomes smaller. Therefore, it is possible to provide a tripod type constant velocity joint which is both highly strong and durable.

Figure 20:
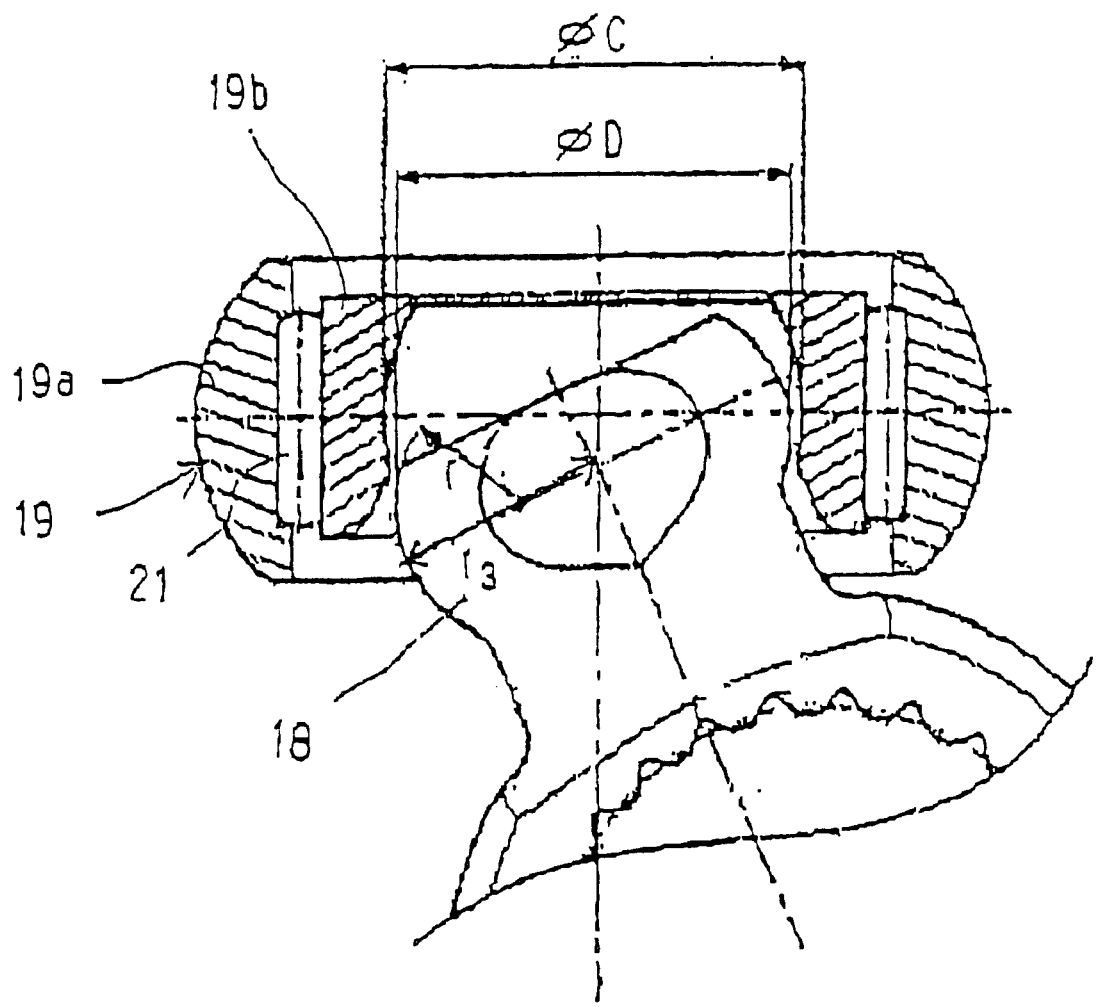
FIG. 20 is an explanatory view showing a relationship regarding location between a conventional trunnion axis and inner roller.
Figure 21:
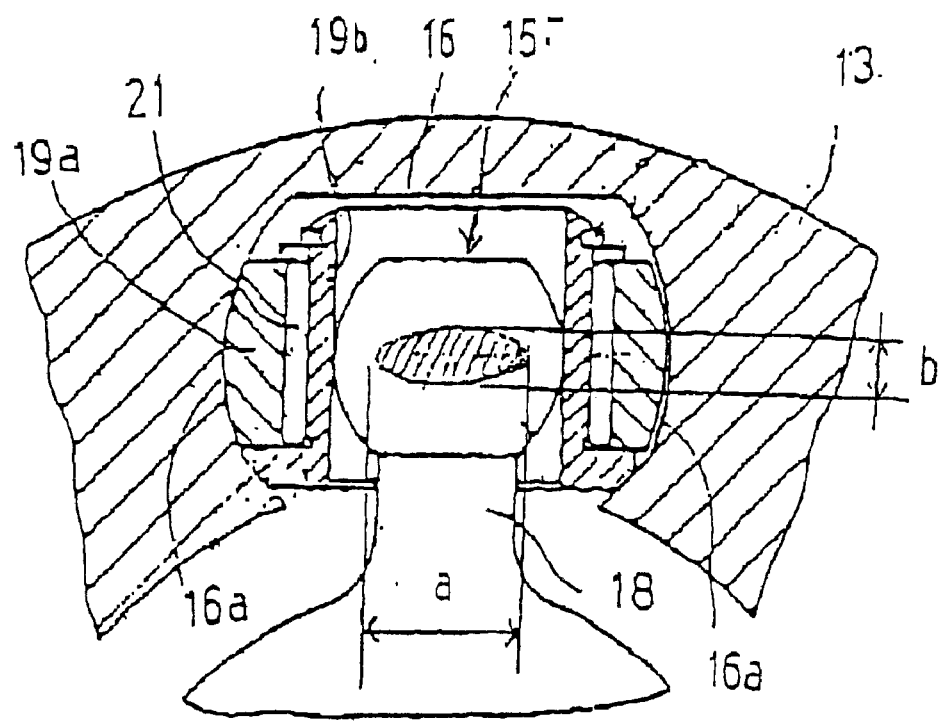
FIG. 21 is a partial longitudinal sectional view showing a contact ellipse of a conventional tripod type constant velocity joint.

In an example, where the cross-sectional shape of the trunnion axis 5a is not a ellipse but a circle, and both sides are provided with respective planes as shown in FIG. 20 (the prior art(FR2752890)), it is necessary that the diameter D of the trunnion 5a is close to the inner diameter C of the inner roller 6b in order to minimize any fluctuation in the rotational direction. In such an example, if the inner roller 6b is strongly pressed onto the trunnion axis 5a, as shown in FIG. 4, a force necessary to press is to excess since four ends of the two planes may interfere with the inner roller 6b, and hence there is a possibility that the inner roller is damaged. On the contrary, if the diameter D of the trunnion 5a is made to be smaller, the fluctuations in the rotational direction become larger. The present invention, by making the trunnion axis 5a to be an ellipse shape in the cross section normal to the trunnion axis, these problems can be solved at the same time.

Next, the second embodiment will be described. This embodiment is almost same as the first embodiment, and so the same reference numbers are used for indicating the same components. The difference between the embodiments, as shown in FIG. 5, is that; long diameters A1 and A2 (shown in FIG. 3(A)) of ellipses at both ends of a generally spherical area of the trunnion axis 5a are somewhat smaller so that the diameter A of the projected curve of the trunnion on a plane inclined $\alpha°$ relative to the plane normal to the trunnion axis can be smaller than the diameter d of the inner roller at the side to be pressed onto the trunnion, as in the FIG. 6.

According to the above structure, as shown in FIG. 6, even if the inner spherical diameter C of the inner roller 6b is close to the long diameter A of the ellipse of the trunnion axis 5a, as shown in FIG. 7, it is easy to assemble the inner roller 6b to the trunnion axis 5a, by rotating the inner roller 6b in the rotational direction indicated by the arrow with the inner roller 6b inclined by $\alpha°$.

Figure 8:
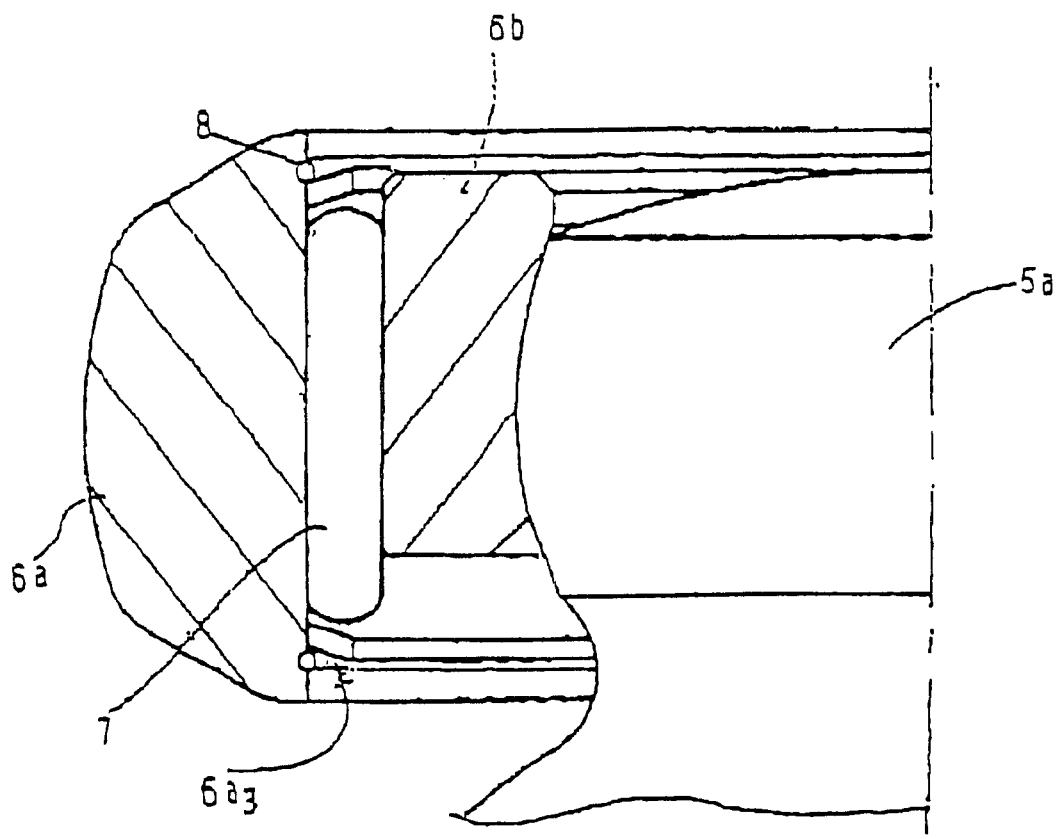
FIG. 8 is a partial longitudinal sectional view of the third embodiment of the roller and the trunnion axis.

The third embodiment will be described with reference to FIG. 8. This embodiment is almost same as the first embodiment, and so the same reference numbers are used for indicating the same components. The difference between the embodiments, as shown in FIG. 8, is that a retainer 6a3 and a needle stopper ring 8 are provided around both circumferential ends of an inner cylindrical area of the outer roller 6a to provide a function as a needle stopper for preventing the needle bearings 7 from being detached. The retainer 6a3 and the needle stopper ring 8 are constructed so that the needle stoppers (rim) of the first embodiment may be modified to separate members.

Figure 9:
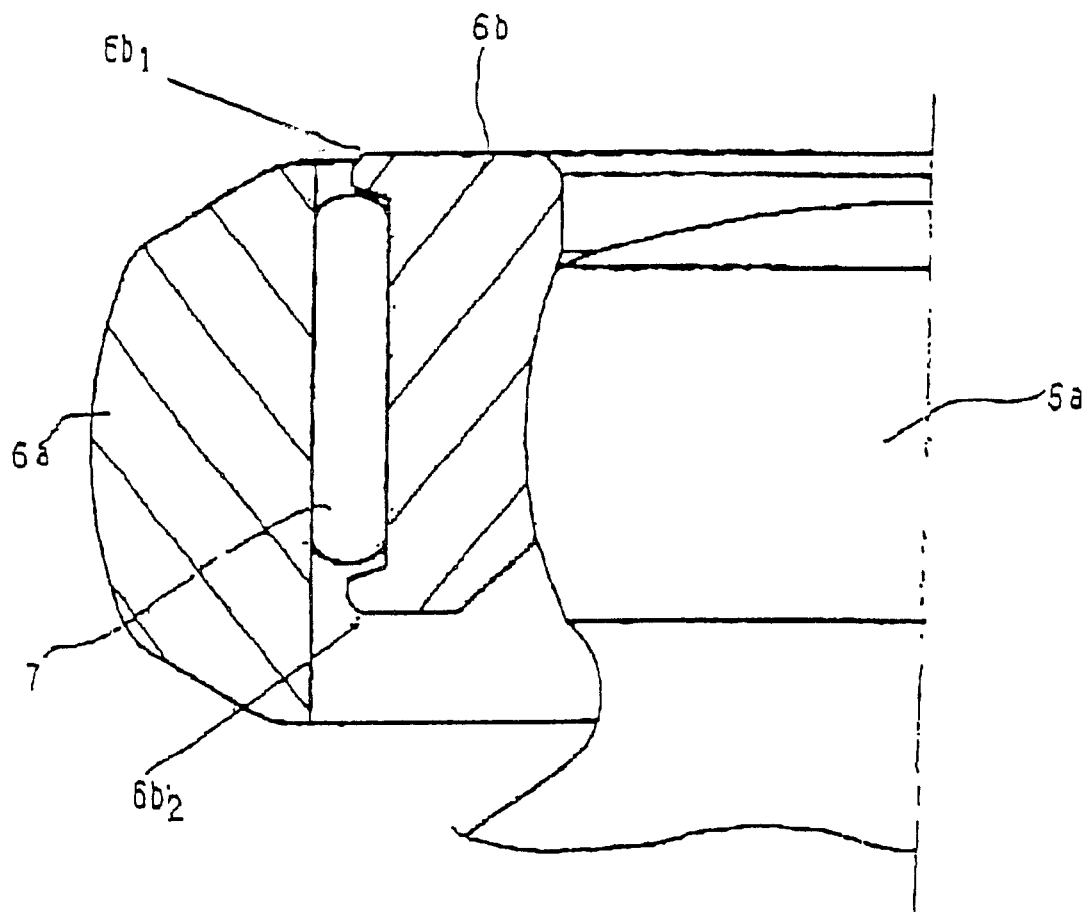
FIG. 9 is a partial longitudinal sectional view of the fourth embodiment of the roller and the trunnion axis.

The fourth embodiment will be described with reference to FIG. 9. This embodiment is almost same as the first embodiment, and so the same reference numbers are used for indicating the same components. The difference between the embodiments, as shown in FIG. 9, is that rims 6b1 and 6b2 are provided integral with the inner roller 6b, around both circumferential ends of an outer cylindrical area of the inner roller 6b to provide a function as a needle stopper. Accordingly, the number of the components can be reduced. Alternatively, it is also possible to constitute a structure wherein only a single rim, either 6b1 or 6b2, is formed to be integral with the inner roller 6b and the other rim is a separate member.

Figure 10:
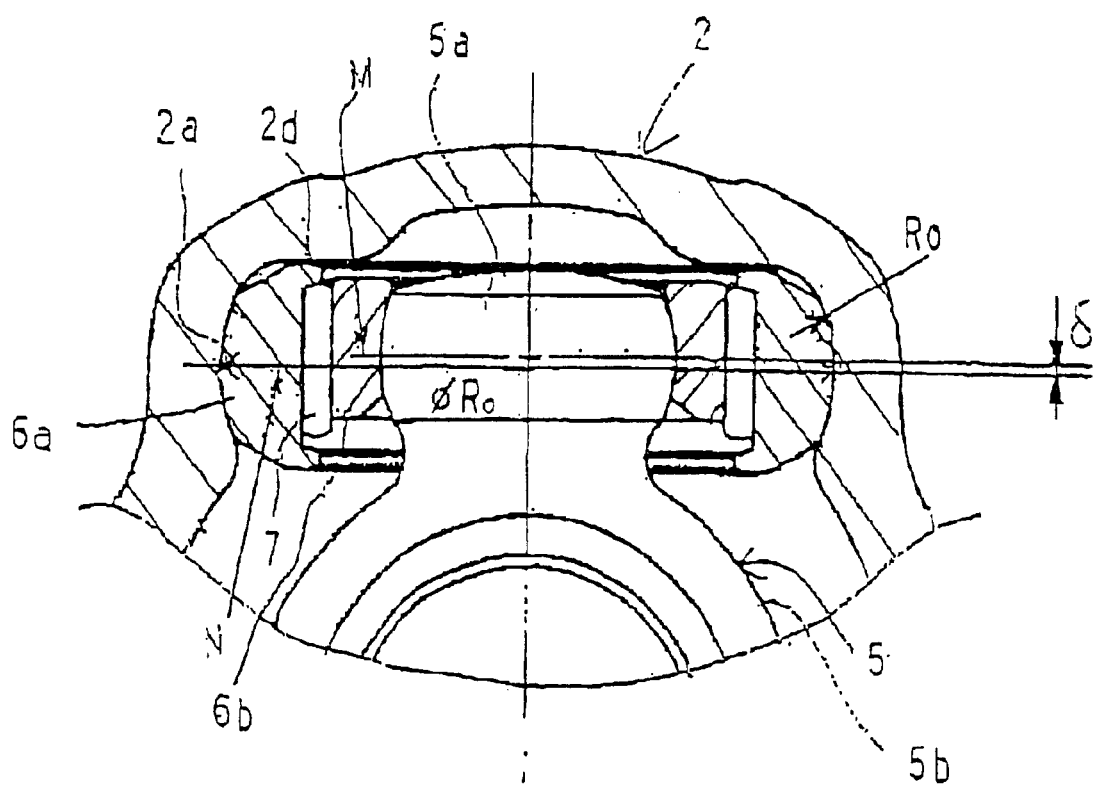
FIG. 10 is a partial longitudinal sectional view of the fifth embodiment of the constant velocity joint.
Figure 11:
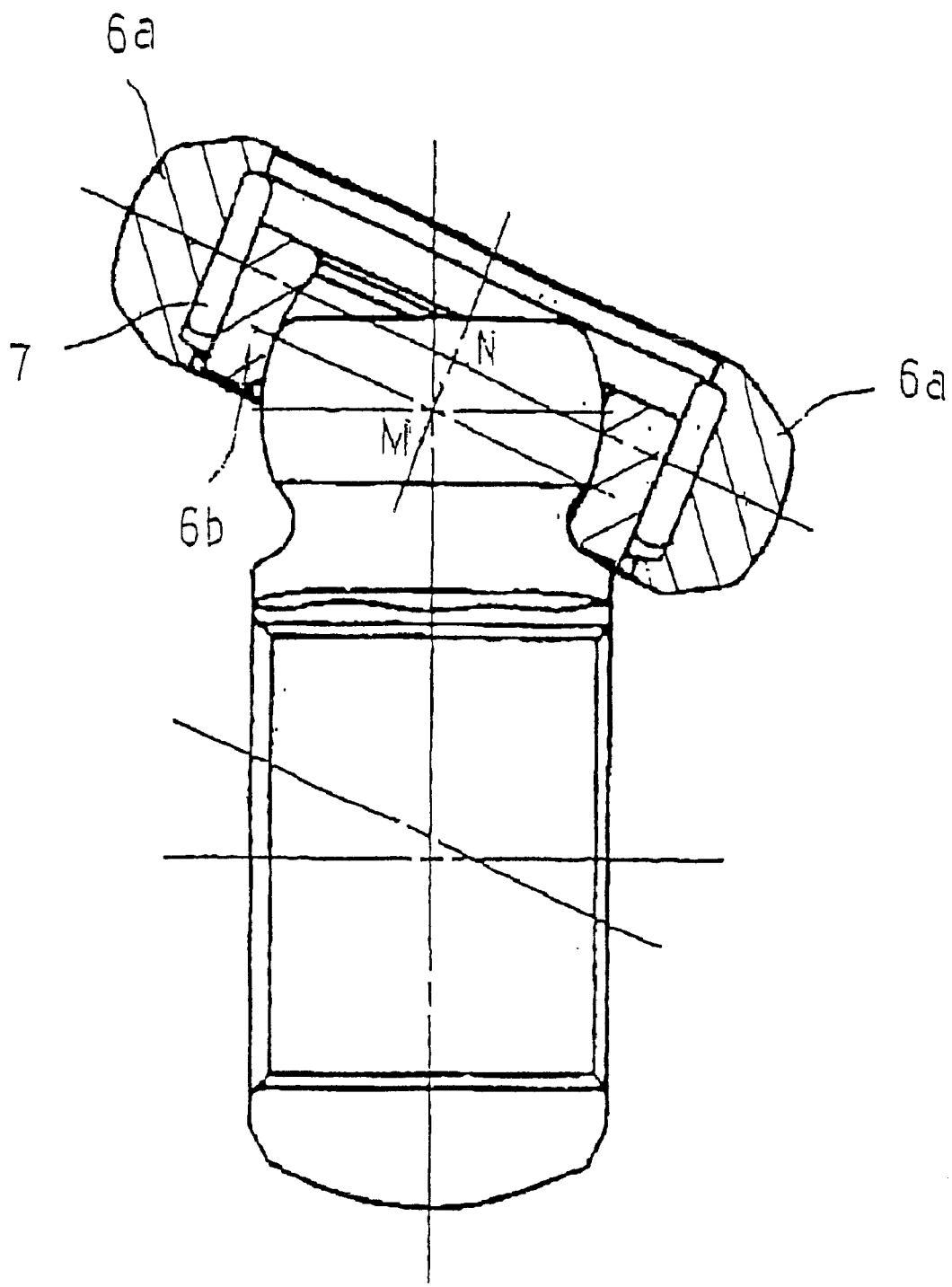
FIG. 11 is an explanatory view showing a state in which a center of the trunnion axis of the fifth embodiment is offset.
Figure 12:
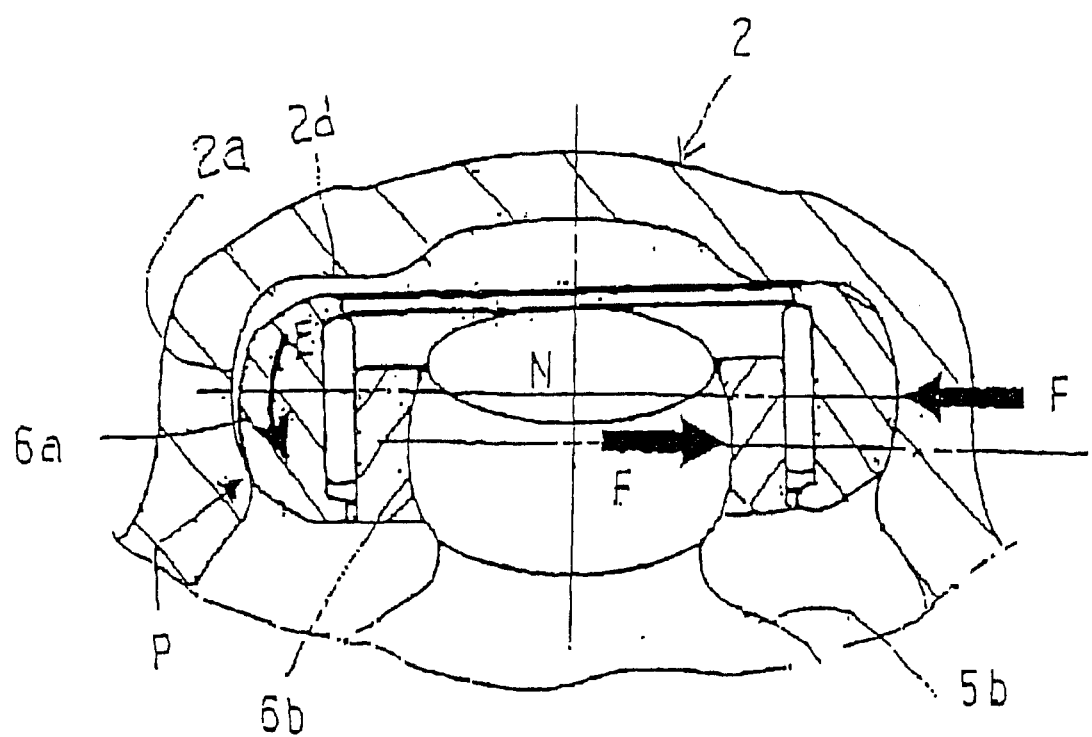
FIG. 12 is an explanatory view showing a load force acting in the fifth embodiment.

The fifth embodiment will be described with reference to FIGS. 10 and 11. This embodiment is almost same as the first embodiment, and the same reference numbers are used for indicating the same components. The difference between the embodiments, as shown in FIG. 10, is that the inner shape of the side face 2a at the side receiving a load of the guide groove of the housing 2 and the outer shape of the outer roller 6a are formed to a R-like shape so that they may engage with each other, and in addition, an offset δ is set to the following range, where the offset δ is defined as an offset between the spherical center M of the trunnion axis 5a and the center N of inner face of the bottom portion 2c of the guide groove 2a, with a joint angle being zero, and Ro is defined as a radius of the longitudinal cross section of the outer roller 6a. $0.02Ro < \delta \, 0.093Ro$ When the constant velocity joint of the first embodiment is rotating with a joint angle present, the spherical center M of the trunnion axis 5a shifts along the axial direction perpendicular to the trunnion axis 5a relative to the center N of the outer face of the outer roller 6a as shown in FIG. 11. If there is a large offset toward the inside of the joint from the center of the side face 2a of the guide groove to the spherical center M of the trunnion axis 5a with a joint angle being zero, the offset is more increased as the joint angle is more large. In such a situation, as shown in FIG. 12, a load (arrow F) between the trunnion axis 5a and the roller assembly 6 acts on a position largely offset from the centerline N of the side face 2a of the guide groove. Thus, a counter clockwise moment is acted on the outer roller 6a in the direction indicated by arrow "E" in FIG. 12. This moment causes the side face 2a of the guide groove to be strongly in contact with the outer face of the outer roller 6a at the point on inner side of the joint, thereby bringing about a resistance against the roller 6, which would be desirable to be avoided.

In the fifth embodiment of the present invention, the offset (δ) between the trunnion spherical center M and the groove centerline N is set to be $0.02Ro < \delta 0.093Ro$, with a joint angle being zero, where Ro is a radius of outer face R of outer roller 6a. Therefore, it is possible to eliminate a generation of excessive moment (arrow E) on the outer roller 6a to avoid a strong contact between the side face 2a of the groove and the outer face of the outer roller 6a at the opposite side of the loaded side, and to attain obtain a less axial force and a smaller rolling resistance of the outer roller 6a.

Figure 13:
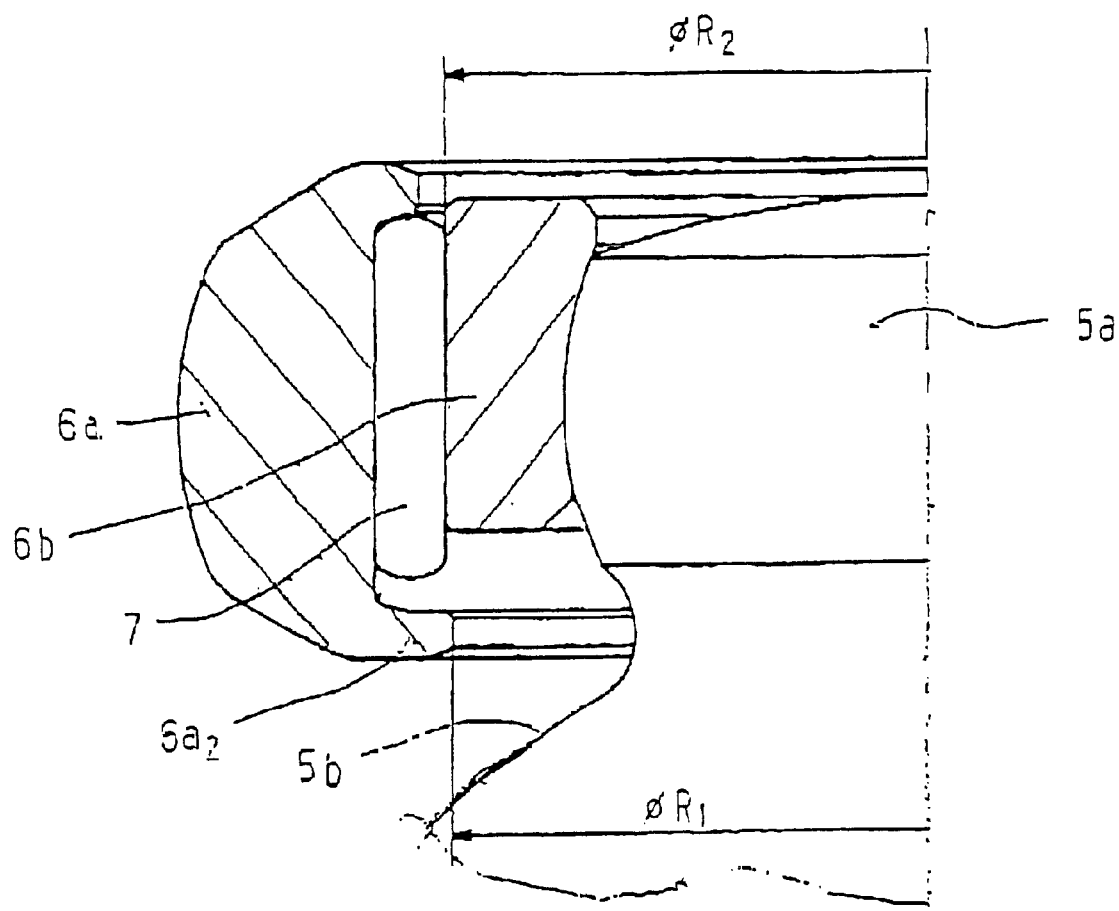
FIG. 13 is a partial longitudinal sectional view of the sixth embodiment of the roller and the trunnion axis.

Next, the sixth embodiment will be described with reference to FIG. 13. This embodiment is almost same as the first embodiment, the same reference numbers are used for indicating the same components. The difference between the embodiments, as shown in FIG. 13, is that the relationship of(R1<R2) exists where R1 is an inner diameter of the rim 6a2 formed on the end of the inner surface of the outer roller 6a and R2 is an outer diameter of the inner roller 6b.

According to the above structure in which the relationship (R1<R2) exists, once the roller assembly comprising the inner roller 6b, the needle bearings 7 and the outer roller 6a is assembled to the trunnion axis 5a, it is substantially impossible for the outer roller 6a to be detached from the inner roller 6b. Additionally, even if the outer roller 6a moves downward in the drawing, it is substantially impossible for the needle bearings 7 to be detached, since the rims 6a2 engage with the boss 5b of the trunnion 5a, and thus it becomes easy to handle the joint.

Figure 14:
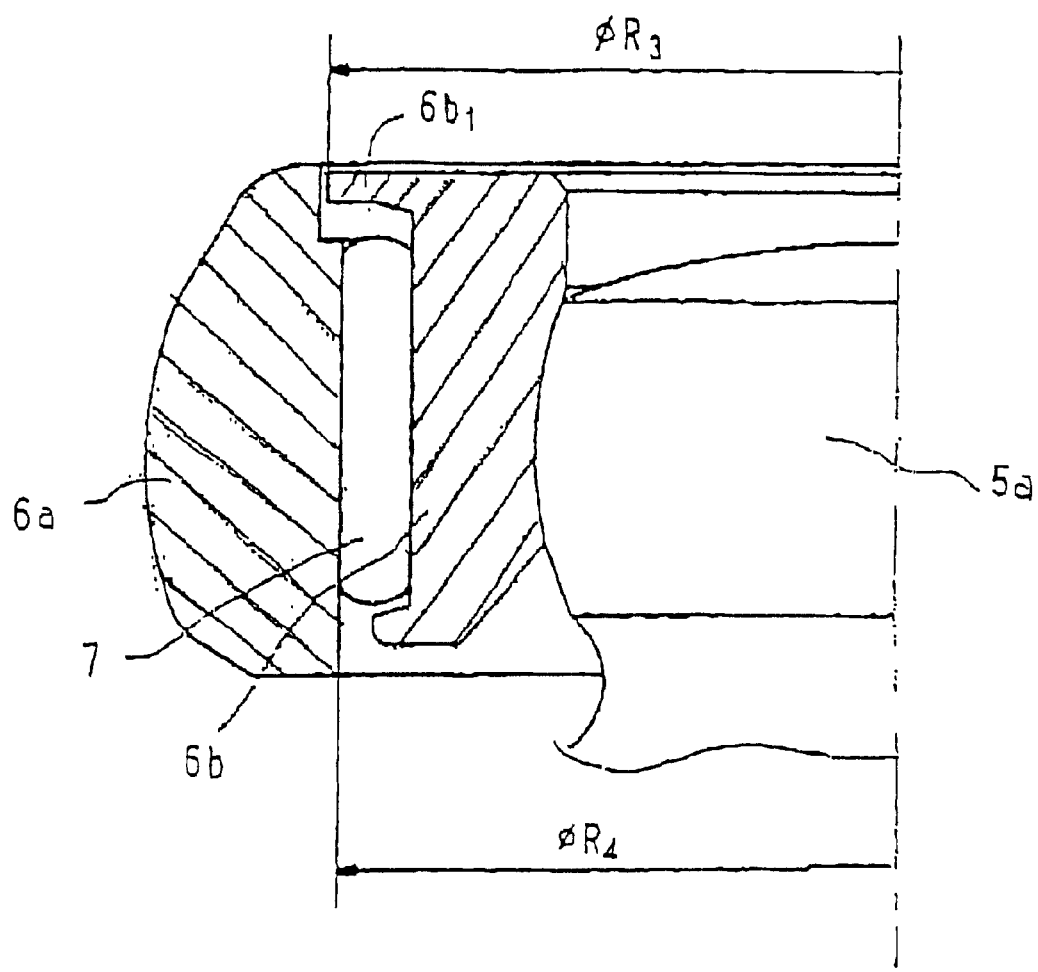
FIG. 14 is a partial longitudinal sectional view of the seventh embodiment of the roller and the trunnion axis.

Next, the seventh embodiment will be described with reference to FIG. 14. This embodiment is almost same as the first embodiment, and so the same reference numbers are used for indicating the same components. The difference between the embodiments, as shown in FIG. 14, is that the relationship of (R4<R3) exists where R3 is a diameter of the rim 6b1 formed on the end of the outer surface of the inner roller 6b and R4 is the inner diameter of the outer roller 6a.

According to the above structure in which the relationship (R4<R3) exists, once the roller assembly comprising the inner roller 6b, the needle bearings 7 and the outer roller 6a is assembled to the trunnion axis 5a, it is substantially impossible for the outer roller 6a to be detached from the inner roller 6b, and thus it becomes easy to handle the joint.

Next, the eighth embodiment will be described with reference to FIG. 15. This embodiment is almost same as the first embodiment, and so the same reference numbers are used for indicating the same components. The difference between the embodiments, as shown in FIG. 15, is that the relationship of $r1 \leq R/2$, $r2 \leq R/2$, and $r2 < r1 \leq 3.8 r2$ exists where r1 is a radius of the longitudinal section of the inner face of the inner roller 6b, r2 is a radius of the longitudinal section of the outer face of the trunnion axis 5a, and R is the maximum diameter of the cross section of the outer face of the trunnion axis 5a.

Figure 15:
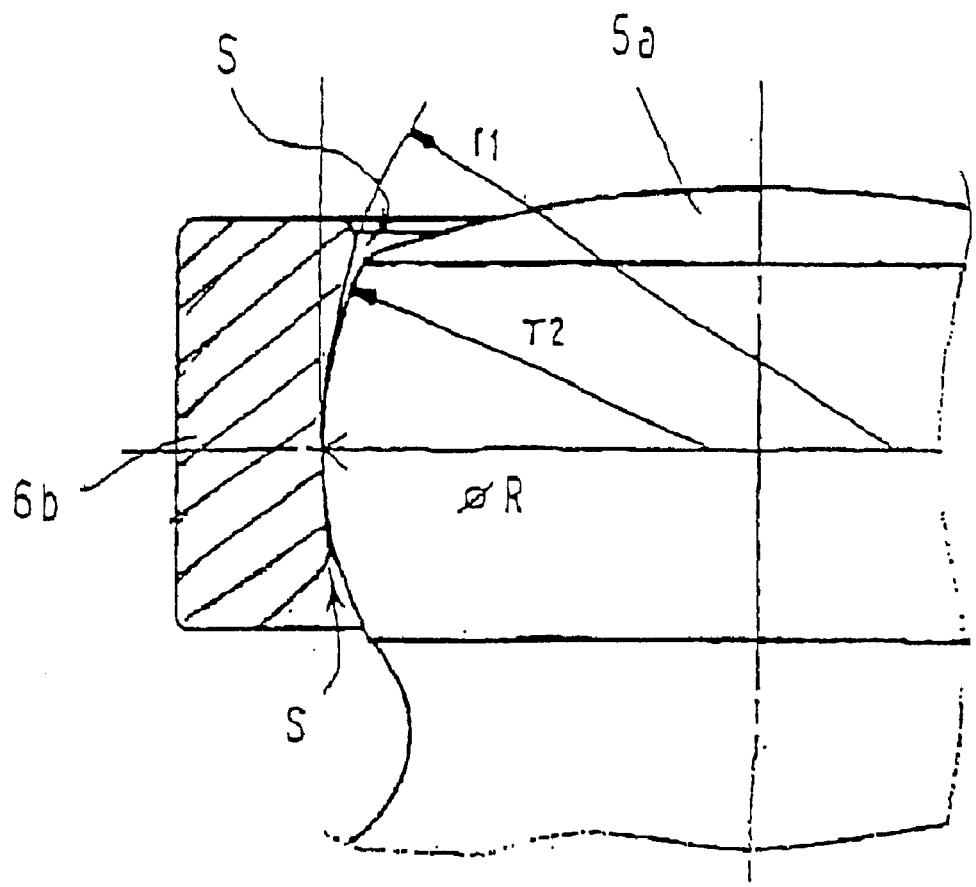
FIG. 15 is a partial longitudinal sectional view of the eighth embodiment of the inner roller and the trunnion axis.

According to the above structure, as shown in FIG. 15, spaces "s" are provided between the respective ends of the inner face of the inner roller 6b and the respective ends of the spherical face of the trunnion axis 5a. The spaces act as a sufficient grease-entry space to provide a better durability and a smooth operation. When the joint is rotated with any joint angle present, the inner face of the inner roller 6b engages with the spherical face of the trunnion axis 5a in their entirety, bringing about a pivotal movement of the trunnion axis 5a which may be absorbed only by sliding between the inner face of the inner roller 6b and the spherical face of the trunnion axis 5a. In the eighth embodiment, the pivotal movement of the trunnion axis 5a may be absorbed while the trunnion axis 5a rolls on the inner face of the inner roller 6b, because the radius r1 of the longitudinal section of the inner face of the inner roller 6b is set to be larger than the radius r2 of the longitudinal section of the outer face of the trunnion axis 5a. Accordingly, a frictional resistance can be diminished.

Figure 16:
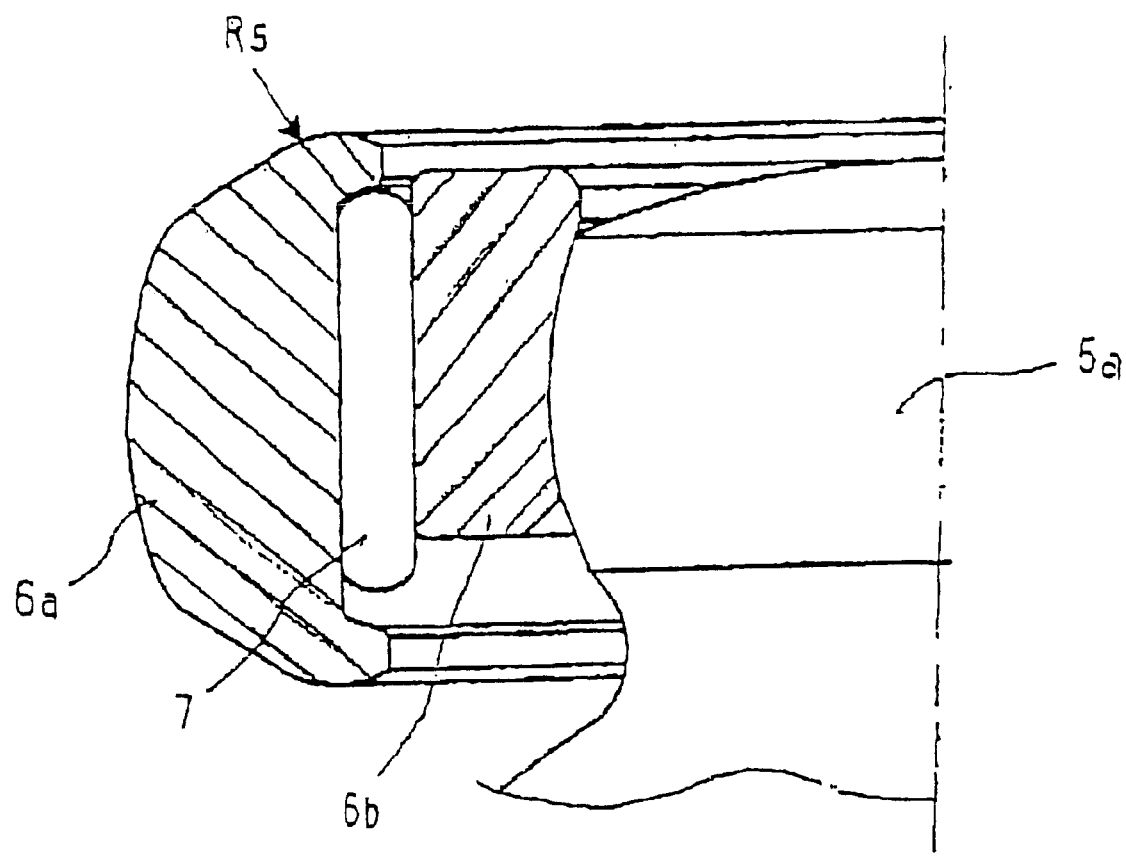
FIG. 16 is a partial longitudinal sectional view of the ninth embodiment of the roller and the trunnion axis.

The ninth embodiment will be described with reference to FIG. 16. This embodiment is almost same as the first embodiment, and so the same reference numbers are used for indicating the same components. The difference between the embodiments, as shown in FIG. 16, is that the outer ends of the outer roller 6a have a curved surface R which is in contact with the guide groove 2a of the housing 2 and is then guided by the same, and which is continuously connected from a central portion of the outer face of the outer roller 6a.

Figure 17:
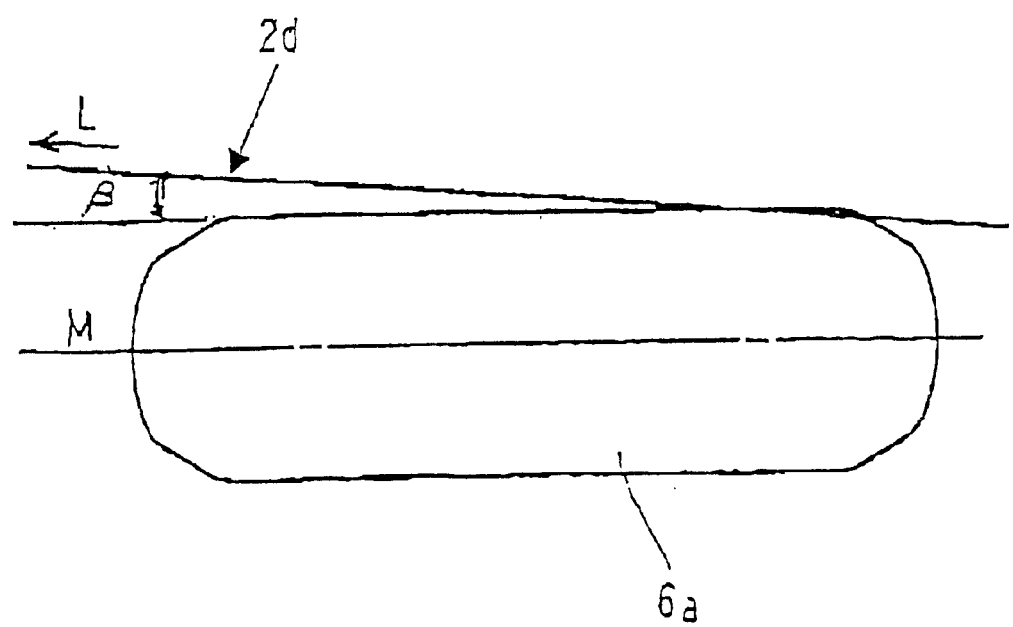
FIG. 17 is an explanatory view showing a configuration in which the outer roller is inclined relative to the side face of the guide groove by an angle β.
Figure 18:
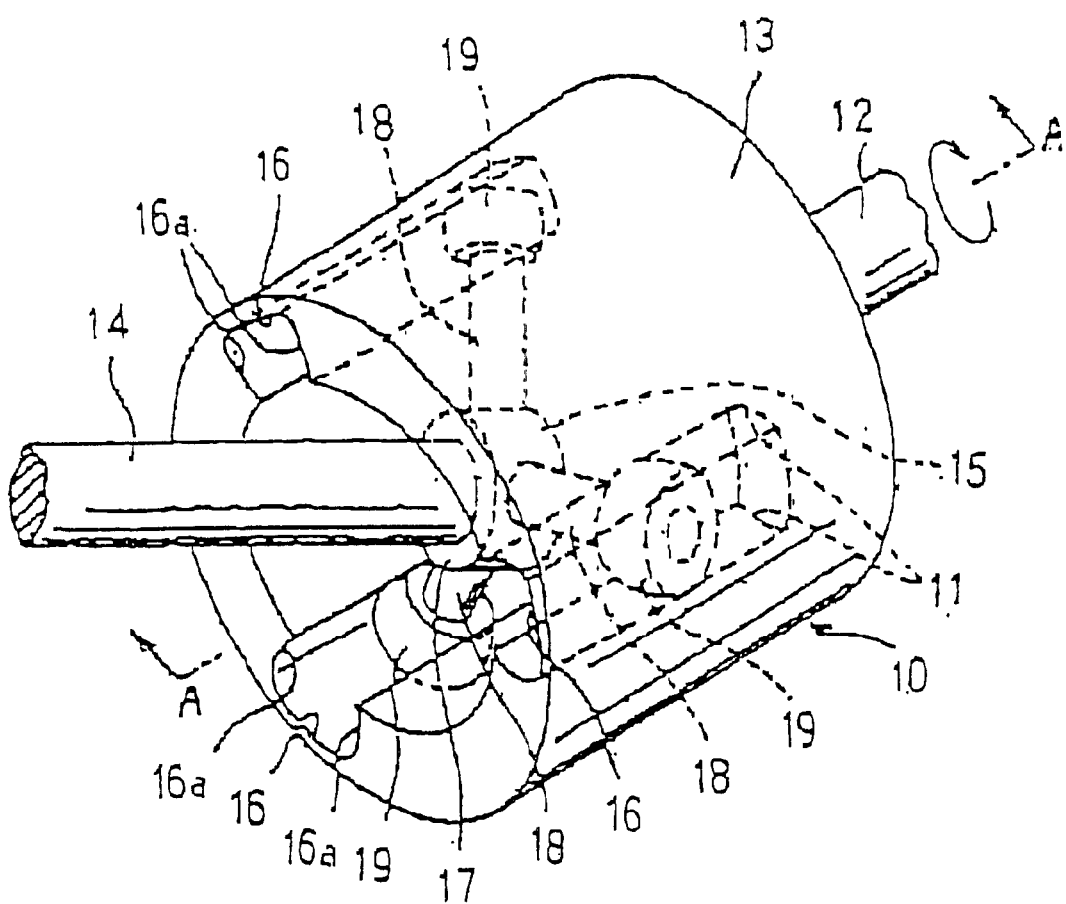
FIG. 18 is a perspective view of a conventional tripod type constant velocity joint.
Figure 19:
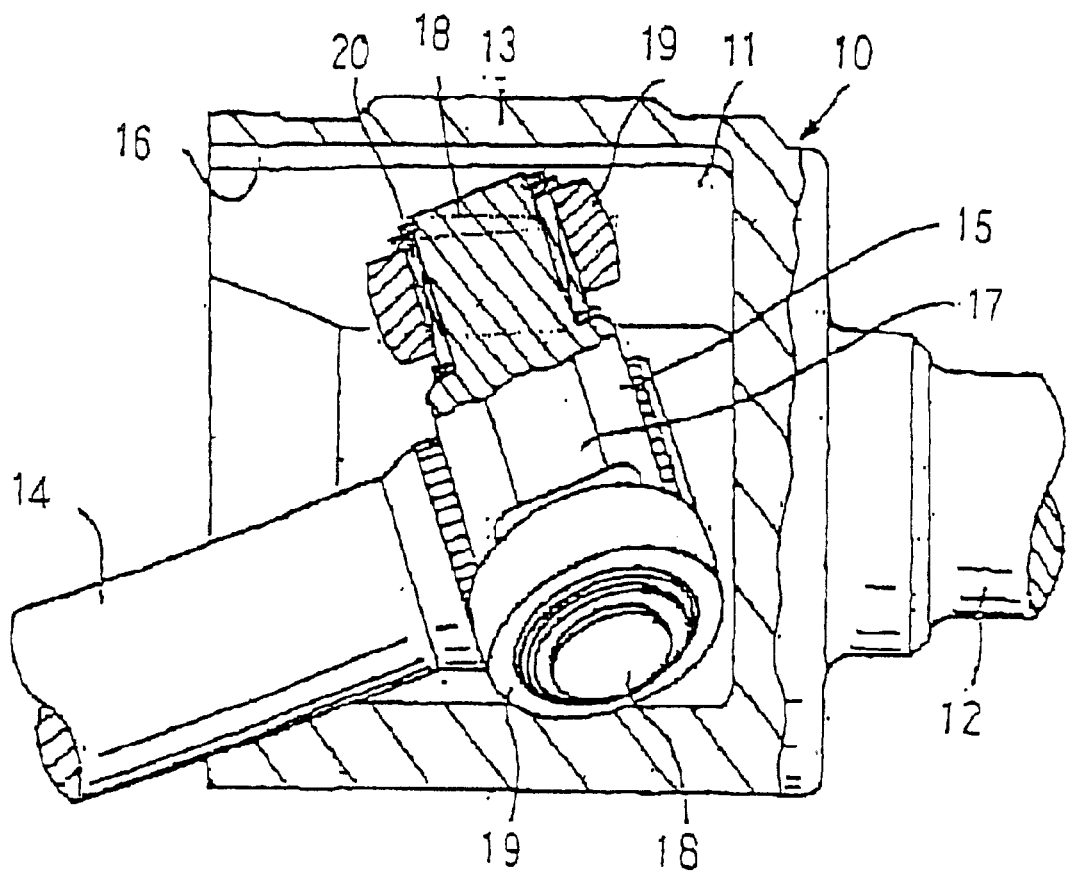
FIG. 19 is a side cross-sectional view of a conventional tripod type constant velocity joint.

According to the above structure, as shown in FIG. 15, When the constant velocity joint is rotated with any joint angle present, the outer roller 6a is guided by on the guide groove 2a and rolls parallel thereto. At this time, as shown in FIG. 17, the outer roller 6a is guided by the tracking guide 2d with the outer roller 6a inclined by an angle β relative to the tracking guide 2d. A curved surface R5 formed on the outer end of the outer roller 6a can avoid an edge contact with the tracking guide 2d and thus reduce a resistance against rolling of the outer roller.

As described above, according to the present invention, a shape of a cross section of the trunnion axis 5a normal to its axis is a ellipse whose short diameter is arranged parallel to the rotational axis of the tripod. A contact ellipse is formed between the inner spherical face of the inner roller and trunnion axis and a long diameter of the contact ellipse can be maintained relatively small without significant fluctuations during rotating. Thus, it is possible to diminish a spin moment acting on the contact ellipse due to the pivotal sliding movement of the trunnion axis. Additionally, it can be avoided that the outer roller A is in contact with the tracking guide 2d as strongly as unnecessary.

Accordingly, the invention can attain a stable rolling of the outer roller, a smaller rolling resistance and a lower axial force of the joint, and a provision of a tripod type constant velocity joint which is both highly strong and durable.

Moreover, according to the invention, it is possible to reduce any oscillation of a vehicle when the tripod type constant velocity joint of the invention is mounted to the vehicle.

The disclosed embodiment is representative of a presently preferred form of the invention, but is intended to be illustrative rather than definitive thereof. The invention is defined in the claims.

What is claimed is:

1. A constant velocity joint comprising:
 a hollow housing having an opening at one end, and being secured at its opposite end to a first rotating shaft such that a central axis of the housing is aligned with that of the first rotating shaft, an inner face of the housing being provided with three guide grooves extending in an axial direction of the housing and being spaced apart equally in a circumferential direction, each groove having a pair of side faces opposed to each other, extending in the axial direction, and a bottom portion connecting between the side faces; and
 a tripod provided at an angle normal to a second rotating shaft and secured to one end of the second rotating shaft, the tripod having three trunnions positioned in the grooves, the trunnions being spaced apart equally in a circumferential direction and securing equally to the second rotating shaft at an angle normal, with respective inner rollers being mounted to outside end portions of respective trunnions, and with respective outer rollers being mounted on the outer faces of inner rollers through a needle bearing, the outer faces of the outer rollers being shaped so as to allow movement only in an axial direction of the guide grooves, the side faces receiving a load, and a part of the bottom portion guiding the rolling of the outer roller;
 the inner rollers having a spherical inner circumferential surface, respectively; and
 the trunnions having an elliptical shape in the sectional view normal to each of their axes, respectively and positioned so that the short diameter of the ellipse is substantially parallel to the second rotating shaft.

2. A constant velocity joint, comprising:
 a hollow housing having an open end and an inner face formed with three axially extending circumferentially spaced guide grooves;
 a tripod having a tripod axis disposed in said housing and including three circumferentially spaced trunnions extending radially outwardly of said tripod axis along respective trunnion axis into said guide grooves;
 a roller assembly carried on each of said trunnions within said guide grooves and supported for rotational, angular and axial movement relative to said trunnions; and
 wherein said trunnions each have an outer surface of elliptical shaped in a section taken normal to said respective trunnion axes with a minor diameter of the ellipse being parallel to said tripod axis.

3. The constant velocity joint of claim 1 wherein each of said roller assemblies includes an inner surface engaging said outer surface of said trunnion, said inner surface being part spherical.

4. The constant velocity joint of claim 1 wherein each of said roller assemblies includes an inner roller having an inner surface that is part spherical with a small diameter d at one end of said roller and a maximum diameter C spaced from said one end, said small diameter d being less that said major diameter of said elliptically shaped trunnions.

5. The constant velocity joint of claim 1 wherein each of said roller assemblies includes an inner roller having an inner surface that is part spherical with a small diameter d at one end of said roller and a maximum diameter C spaced from said one end, each of said trunnions having a projection diameter A measured at an assembly angle α.

6. The constant velocity joint of claim 5 wherein d<A.

7. The constant velocity joint of claim 5 wherein d≧A.

8. A method of installing a roller assembly of a tripod constant velocity joint on a trunnion of the joint having an elliptical outer surface in a section taken normal to a trunnion axis, comprising:
 aligning the roller assembly with the trunnion; and
 forcing the roller assembly onto the trunnion causing the roller assembly 6 to deform elastically during installation and to return following installation.

9. A method of installing a roller assembly of a tripod constant velocity joint on a trunnion of the joint having an elliptical outer surface in a section taken normal to a trunnion axis, comprising:
 tilting the roller assembly relative to the trunnion axis; and
 guiding the roller assembly onto the trunnion while so tilted.

* * * * *